F. PARDEE.
RETARDER FOR MATERIALS IN SPIRAL SEPARATORS.
APPLICATION FILED APR. 11, 1910.
977,036.
Patented Nov. 29, 1910.
2 SHEETS—SHEET 2.
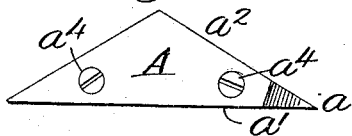
Fig. 4.
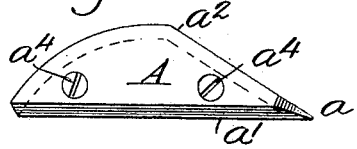
Fig. 5.
Fig. 4.ª
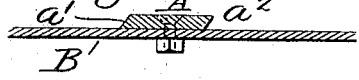
Fig. 5.ª
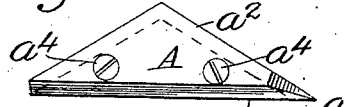
Fig. 6.
Fig. 7.
Fig. 6.ª
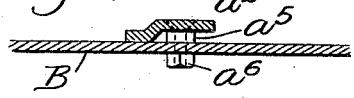
Fig. 7.ª
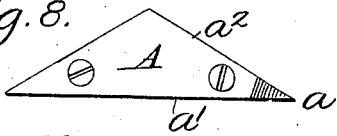
Fig. 8.
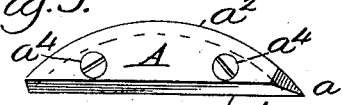
Fig. 9.
Fig. 8.ª
Fig. 9.ª
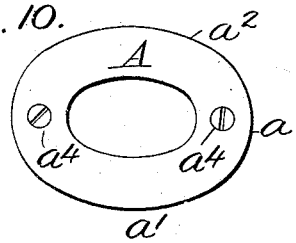
Fig. 10.
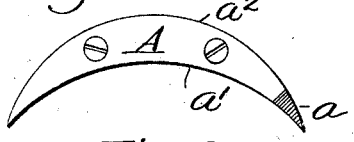
Fig. 11.
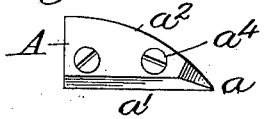
Fig. 13.
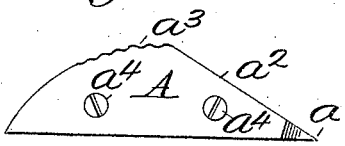
Fig. 12.
WITNESSES:
James P. Duhamel.
Dorothy McManus.
INVENTOR
Frank Pardee,
BY
Attorneys

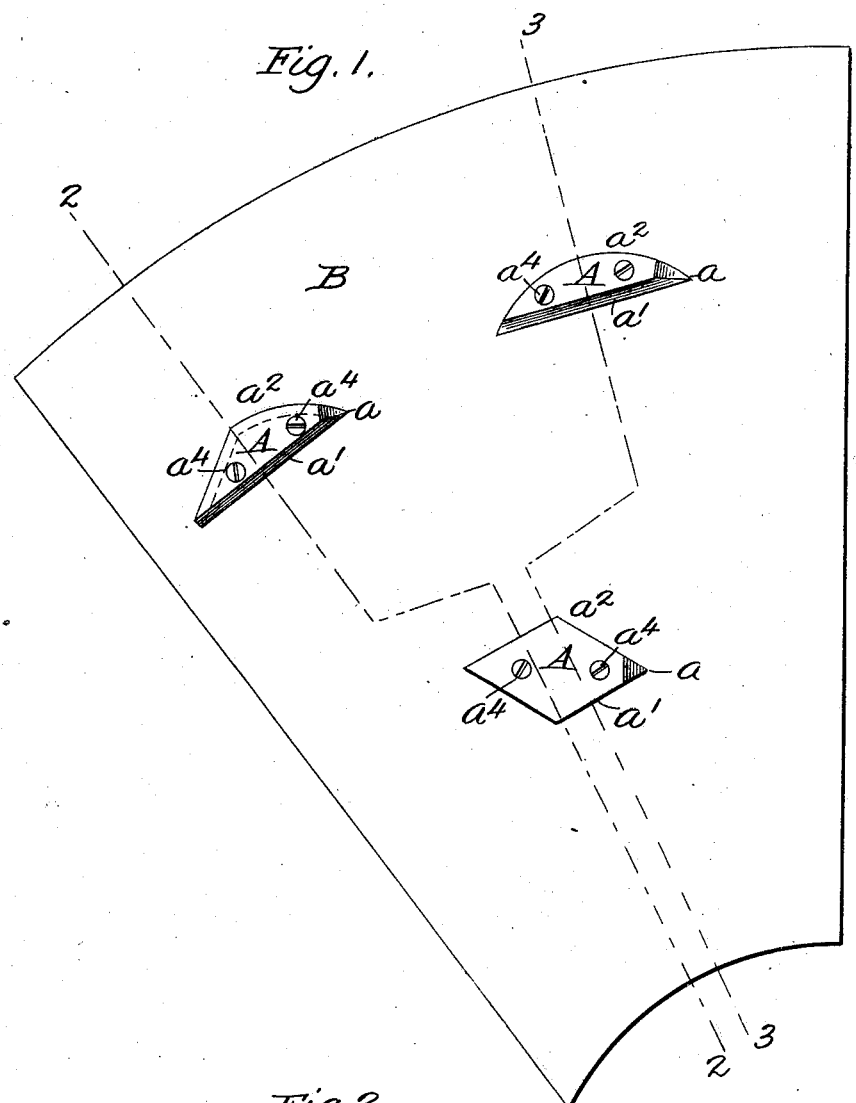

UNITED STATES PATENT OFFICE.

FRANK PARDEE, OF HAZLETON, PENNSYLVANIA, ASSIGNOR TO ANTHRACITE SEPARATOR COMPANY, A CORPORATION OF PENNSYLVANIA.

RETARDER FOR MATERIALS IN SPIRAL SEPARATORS.

977,036. Specification of Letters Patent. Patented Nov. 29, 1910.

Application filed April 11, 1910. Serial No. 554,873.

*To all whom it may concern:*

Be it known that I, FRANK PARDEE, a citizen of the United States, residing in Hazleton, county of Luzerne, and State of Pennsylvania, have invented certain new and useful Improvements in Retarders for Materials in Spiral Separators, of which the following is a specification, reference being had to the accompanying drawings.

The invention relates to retarding surfaces for spiral separators, to aid in making a proper separation of the foreign substances or heavier materials, such as slate and "bone", from the coal.

In Patents Nos. 629,590, and 629,591, issued to me on July 25th, 1899, an axial incline or inward pitch of the plates or jackets, was shown, as were also ribs, corrugations or undulating surfaces forming ledges, to check or guard against the outward movement of substances which should remain near the center. And Patent No. 629,592, of the same date promiscuously showed, without details, a variety of irregular retarding surfaces as to which it was stated, that they need not form an integral part of the floor of the spiral, and that it was desirable that these surfaces should not be too closely interspersed.

The theory of the first two patents mentioned, implied or involved a guarding against the outward movement of slate and bone by undulating surfaces or means other than the inward pitch of the plates, and the third patent stated that irregular surfaces or slight obstacles deviated from the plane of the floor on the spirals, would change the course of the slate, while the coal would glide over or around the same impediments and come on the outside of them.

In the third patent a preference was given to the forms of deviated surfaces which had inward inclines or extensions, and it was recognized as desirable that abrupt projections or abutments which might stop the slate, or have a like effect on coal too far in on the spiral when near the outlet, should be avoided.

The illustrations and descriptive matter in these previous patents, made manifest the desirability of preventing slate and bone from getting too far out on the spiral; but the desirability of utilizing the outer part of the perimeter of the retarding surfaces, as a means for overcoming the tangential tendency of passing slate and bone, and for leading or guiding erratic materials to or along their proper runways, was nowhere suggested.

None of the ribs, corrugations or undulating surfaces of the first two patents; nor of the slits, humps, hills, ridges or studs, shown, described or indicated in the third patent; nor of the valleys and ridges developed in practice, by slits, angle cuts and bends or curvatures of the metal; nor of any of the other devices subsequently tried, used or experimented with by me, had outer edges or contour formations designed to act to the best advantage on erratic contactual slate and bone.

An ideal retarder is one which will not only act preventively to the greatest possible advantage, but also remedially, under conditions with which the preventive measures do not comply. The outer contour should be free from the defects of the older retarding devices and structures, and adapted to perform functions of which they were not capable.

The object of the present invention is to produce a retarder for materials in a spiral separator, which will have the desirable features of retarding surfaces heretofore known or used, and also possess new formations or adaptations, and new functional features.

The invention consists of a retarder having the characteristics hereinafter more fully described, and pointed out or indicated in and by the claims hereof, considered as an article in itself, or as a part of a spiral plate, or as an element of a combination with such a plate.

Figure 1, of the drawings is a plan view of a spiral separator plate or jacket, showing three detachably secured retarders having different forms of perimeter, the outer and inner edges being adapted to act on the materials by an edge-frictional contact, after the materials pass the divider-end, shown as being pointed or beveled. Figs. 2, and 3 are sectional views taken respectively on the lines 2, 2, and 3, 3, of Fig. 1. Figs. 4 and 4ª are respectively plan and central cross-sections of another form of retarder and part of the jacket; Figs. 5 and 5ª, Figs. 6 and 6ª, Figs. 7 and 7ª, Figs. 8 and 8ª, and Figs. 9 and 9ª, are plan and central cross-sections of other formations. Figs. 10 and 11 are respectively plan views of oval and crescent forms of retarder, and Fig. 12 is a plan view showing a part of the outer edge contour as being serrated. Fig. 13, is a plan of a short retarder.

For convenience of illustration the retarders A, are all shown as being made separately from the plate, and in all figures of the drawings except Fig. 10, a beveled divider-end $a$ is shown which acts to disperse materials when several pieces are moving together or *en masse*.

When the divider-end $a$ is properly shaped for the purpose stated it is not necessary that the inner edge $a^1$ should be sloped, but it is so shown on two of the retarders in Figs. 1, 2 and 3, and on those of Figs. 5, 6 and 9. Fig. 7 shows an inner slope $a^1$ near the inner edge, formed by a bend in the metal, while a similar slope extending down to the surface of the plate is shown in Figs. 1 and 3.

The outer edge or contour $a^2$ of the retarder is curved or given some equivalent form, such as angles or angles and curves which are adapted to guide contactual moving slate or bone downwardly, or inwardly, and permit or guide the coal outwardly, or tangentially. The outer edge or contour $a^2$, may be vertical so as to set substantially at right angles to the plate or jacket, or it may be inwardly beveled and recede so as to form an acute angle with the plate, as shown in Figs. 2, 5$^a$, 6$^a$, and 9$^a$. The whole or a part of the outer contour $a^2$ may be more or less sharp, or rough, or it may be serrated as shown at $a^3$, in Fig. 12. Any of these formations will adapt the outer contour of the retarder, to have an edge friction with contactual heavier materials tending to get or which may get outside of them. The retarders if made separately from the plate B may be secured thereto by screws $a^4$, or by any other suitable means.

In Figs. 1, 3, 7, and 7$^a$, the outer edge $a^2$ is shown as being kept above the surface of the plate by washers $a^5$, through which the securing screws $a^4$ pass and are retained by nuts $a^6$. The contour of that part of the perimeter designated as the inner edge $a^1$, is immaterial so long as its form is not such as to occasion a stoppage of materials. The slope of the inner edge, if it be sloped, only comes practically in contact with the under side of moving materials, and such slope may be the only part of the retarder which steepens or changes the flare of the surface on which the materials move, but other retardant changes of flare may be made if desired. When the inner edge $a^1$ is not sloped it will have an edge-friction on contactual materials which lack force to mount and pass over the top of the retarder.

The axial incline, or inward pitch given to the plates or jackets, permits the force of gravity to act obliquely toward the axis, and, under proper conditions, this force and the frictional resistance would be sufficient to counterpoise, or overcome, the tangential tendency caused by centrifugal force. But, in practice, retarding surfaces are required to aid in establishing an equilibrium beween the opposing forces, and produce a helical movement of the different materials within proper bounds, as well as to overcome the centrifugal force so that the heavier materials may turn inwardly.

The slate takes the inner course, or that nearest to the axis, the bone runway is next on the plates, while that for the coal is nearest the periphery of the spiral, or more commonly on a separate coal-thread to which the coal leaps from the slate-thread or that for slate and bone.

Assume as an extreme case, capped material, classed as bone, to be sliding on a spiral plate with one of its coal sides or edges in contact with the plate, the weight of the piece would be slightly greater, and its speed somewhat slower than if it were pure coal. If such a piece gets far out on the spiral the slaty part or cap which increases its weight may not be sufficient, with the aid of the axial incline alone, to prevent the piece from getting beyond the bone runway. Such pieces often pass out and away with the coal. But, by coming in contact with the outer edge or contour $a^2$ of the retarder, a piece of that character, in addition to its friction on the surface of the plate, would have an edge-friction on the outer contour of the retarder, as an aid in changing the course and guiding it to or along the bone runway. The edge-friction provided for by the outer contour $a^2$ of the retarder would act beneficially, in more or less marked degrees, on contactual pieces of bone having coal on each side of slate strata, and on pieces of bone with coal between slate surfaces, and more decidedly on erratic pieces of slate.

In dealing with wet materials, the moisture acts as a lubricant on the surface of the plates of the spiral, and diminishes the retardant effect of the axial incline or pitch. But the outer edge $a^2$, of the retarder, may readily scrape off or cut through the moisture or lubricant, in which case the gritty part of the contactual heavier material bears on such edge. Edge-friction by contact on the outer and inner edges also finds a utility on plates which have been worn smooth or become coated with particles, or dust, from the materials.

As coal moves with more speed than either slate or bone, the edges of the retarder are not likely to deflect the coal or divert it from the tangential movement. Part of the coal will escape contact with the retarders, and the movements of contactual coal would usually be along the tangential part of the edge $a^2$, or over, across and beyond the retarder. In all cases the contour $a^2$, and the retarder in its completeness, has an aptness for appropriate action on the different contactual materials, and it adds to and maintains the efficiency of the machine in some ways which are quite different from those observed in the use of the older forms of retarding surfaces.

As already intimated the top surface of the retarder, its edges and other parts of the perimeter, are susceptible of variation, but the limits within which such variations may be made cannot be defined with geometric certainty. It is quite evident that angles, or combinations of angles and curves, may form the outer edge, and act in substantially the same way and have the same kind of utilities. It is not essential to any of the claims, unless therein stated, that the retarder be detachable from the plate or jacket; nor is it essential that any given number of these retarders be used on one spiral plate or jacket, nor that any given number of plates equipped with them be used in the composition of a spiral. One retarder may be used alone, or with other analogous or non-analogous forms on the same plate, or two or more may be likewise used on one plate.

In any combination that may be made, the locations of the retarders and the positions of their contact and guiding surfaces are preferably to be determined with respect to intervening free spaces for tangential, helical and inward movements of materials. These characteristics, however, form no part of the subject matter hereof, but are more directly embraced as features in an application executed by me on even date herewith, and filed as Serial No. 554,872.

Having thus described my invention what I claim as new and desire to secure by Letters Patent is:

1. A retarder for materials in a spiral separator, said retarder having an outer contour adapted to have edge-frictional contact with the heavier materials, and to guide and draw contactual materials in the direction of said contour.

2. A retarder for materials in a spiral separator, said retarder having a sloped end adapted to act as a divider, and an inner and outer contour the latter adapted to have edge-frictional contact with the heavier materials, and to guide and draw contactual materials in the direction of said contour.

FRANK PARDEE.

Witnesses:
ANNA W. WETTERAU,
LILLIAN SAUNDERS.